A. A. BARNES.
SAW HANDLE.
APPLICATION FILED OCT. 5, 1911.
1,035,675.
Patented Aug. 13, 1912.
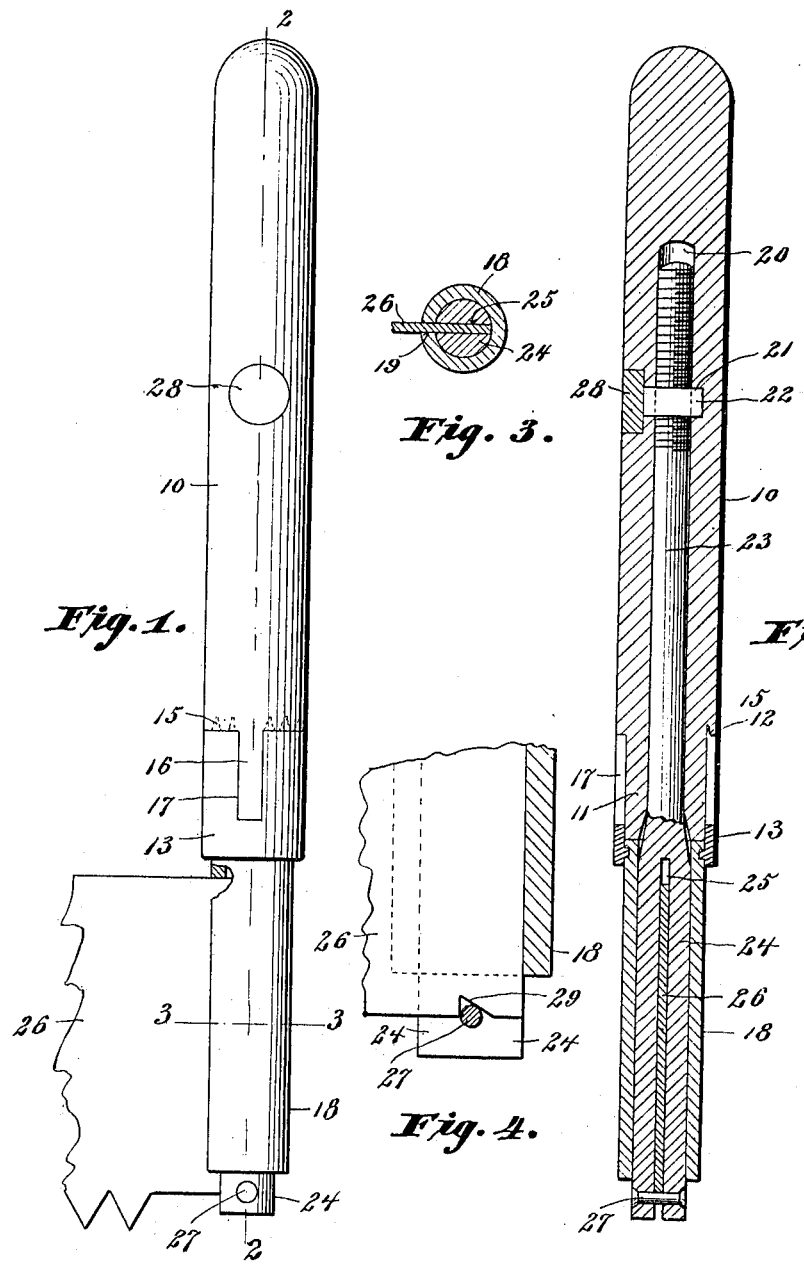
Witnesses
A. R. Walton
G. Darron
Inventor
Alfred A. Barnes
By Max A. Schmidt
Attorney

UNITED STATES PATENT OFFICE.

ALFRED A. BARNES, OF HARRISON, IDAHO.

SAW-HANDLE.

1,035,675.    Specification of Letters Patent.    Patented Aug. 13, 1912.

Application filed October 5, 1911. Serial No. 653,068.

*To all whom it may concern:*

Be it known that I, ALFRED A. BARNES, a citizen of the United States, residing at Harrison, in the county of Kootenai and State of Idaho, have invented certain new and useful Improvements in Saw-Handles, of which the following is a specification.

This invention relates to that type of saw handles which are adapted to be detachably connected to the blades of cross-cut saws.

The object of the invention resides in the provision of a saw handle of the character named which can be easily and quickly attached to and detached from a saw blade when occasion demands.

A further object of the invention is to provide a fastening for the handle whereby it will be firmly held in place on the blade.

The invention also has for its object to provide a structure which enables the handle to be fastened close to the end of the blade so that none of the effective portion of the blade is taken up by the handle.

With these objects in view, the invention consists in the details of construction and in the arrangement and combination of parts to be hereinafter more fully described and claimed.

In order that the invention may be better understood, reference is had to the accompanying drawing forming a part of this specification, in which drawing—

Figure 1 is a side elevation of the end portion of a cross-cut saw, showing the handle attached thereto, the latter being shown partly broken away; Fig. 2 is a longitudinal section on the line 2—2 of Fig. 1; Fig. 3 is a cross section on the line 3—3 of Fig. 1, and Fig. 4 is an enlarged sectional detail showing the shape of the notch in the saw blade.

Referring specifically to the drawing, 10 indicates the grip or handle proper, which is preferably made of wood, that being considered the lightest and most suitable material. The lower end of the grip is reduced as at 11, said reduced portion producing a shoulder 12. Fitted upon the reduced portion 11 is a ferrule 13 which is provided at its inner end with terminal projections 15 which are adapted to be driven into the shoulder. The reduced portion of the grip is also provided with ribs 16 which enter slots 17 in the ferrule. The ferrule is thus rigidly secured to the grip, relative rotation of the parts being prevented by the ribs 16.

The outer end of the ferrule extends beyond the extremity of the grip and carries a rotatable sleeve 18 which is provided with a longitudinal slot 19 extending through the outer end of the sleeve and having its inner end disposed in proximity to the outer end of the ferrule. The grip 10 is provided with a longitudinal socket 20, and a transverse passage 21 opening through one side of the handle and intersecting the socket. In the passage 21 is mounted a non-rotatable nut 22, the threaded opening of which is in line with the bore 20. Into the nut 22 screws the threaded shank 23 of a blade clamp 24, said clamp extending from the grip and passing loosely through the sleeve. The clamp has a longitudinal slot 25 adapted to receive the saw blade 26, and the outer end of said slot is closed by a pin or rivet 27 extending across the slot. The outer end of the passage 21 is closed by a plug 28. By rotating the clamp in one direction, it will be apparent that the same will be drawn inwardly; or if the clamp is held stationary and the grip 10 is rotated, the same result can be obtained.

In order to attach the grip to the saw blade, it is necessary only to screw the clamp 24 outwardly a sufficient distance and to position the slot 19 to register with the slot 25. The end of the saw blade is then inserted in said registering slots and the grip 10 rotated to draw the clamp inwardly. This movement of the clamp will force the lower edge of the saw blade into engagement with the pin 27 and the upper edge of the blade into engagement with the inner end of the slot 19, and thereby securely bind the blade to the handle. The sleeve 18 fits against the end of the saw blade and over it, and the blade is thus held firmly in every direction, without the necessity of being drawn so tightly by the clamp that it is difficult to remove it. The handle can therefore be easily and quickly attached by the operator with one hand, leaving the other hand free to hold the blade, and it is firm and immovable against pressure in every direction. The lower edge of the saw blade has a notch in which the pin 27 seats. The wall of this notch is inclined on one side as shown at 29 in Fig. 4, said incline being engaged by the pin 27, so that when the clamp is tightened up, the end of the saw blade is drawn back tightly against the sleeve 18, as shown in Fig. 3.

The drawing up of the handle by means of a violent wrenching on the threads has been a great fault with the ordinary saw handles of the tightener-bar-type, for the reason that it makes the removal of the handle difficult, as it is hard to unscrew, it being impossible at times to do so without breaking the handle. The saw is also liable to be caught in the cut, or broken by a falling tree. Furthermore, the thread is soon stripped either on the bolt or the nut, thus spoiling the handle. In my improved handle these difficulties are entirely obviated. The pin 27 by its engagement with the incline 29 wedges the end of the saw blade against the inside of the sleeve 18 opposite the slot 19, thus obtaining absolute firmness and rigidity of the handle against pushing or pulling, and this is effected without drawing violently on the threads of the shank or the nut, thereby leaving the handle easily removable, and at the same time firm and rigid. By the structure herein described the handle is also attached very close to the end of the saw blade, so that none of the effective portion thereof is taken up by the handle.

I claim:

1. The combination with a saw; of a handle comprising a grip, a saw clamp carried by the grip, a sleeve carried by the grip, said sleeve having a slot into which the end of the saw extends, and means actuated by the saw clamp for drawing the end of the saw against the inner surface of the sleeve.

2. The combination with a saw; of a handle comprising a grip, a saw clamp carried by the grip and adjustable in the direction of its length to clamp the saw, a sleeve carried by the grip, said sleeve having a slot into which the end of the saw extends, and means actuated by the saw clamp for drawing the end of the saw against the inner surface of the sleeve.

3. The combination with a saw having an inclined notch in its bottom edge; of a handle comprising a grip, a saw clamp carried by the grip, a pin carried by the clamp and seating in the notch of the saw, and a sleeve carried by the grip, said sleeve having a slot through which the saw extends with its end in engagement with the inner surface of the sleeve.

4. The combination with a saw having an inclined notch in its bottom edge; of a handle comprising a grip, a saw clamp carried by the grip and adjustable in the direction of its length, said clamp having a slot to receive the saw, a pin extending across the slot and seating in the notch of the saw, and a sleeve carried by the grip and having a slot adapted to register with the slot of the clamp, into which sleeve the saw extends with its end in engagement with the inner surface of the sleeve.

5. The combination with a saw having an inclined notch in its bottom edge; of a handle comprising a grip, a saw clamp carried by the grip and adjustable lengthwise by a rotary movement, said clamp having a slot to receive the saw, a pin extending across the slot and seating in the notch of the saw, and a sleeve carried by the grip and having a slot adapted to register with the slot of the clamp, into which sleeve the saw extends with its end in engagement with the inner surface of the sleeve.

In testimony whereof I affix my signature in presence of two witnesses.

ALFRED A. BARNES.

Witnesses:
 E. T. PARSONS,
 M. A. KIGER.